US006533443B2

(12) United States Patent
Kawamura et al.

(10) Patent No.: US 6,533,443 B2
(45) Date of Patent: Mar. 18, 2003

(54) HEAD LAMP FOR AUTOMOBILE

(75) Inventors: Takayuki Kawamura, Isehara (JP); Kinya Iwamoto, Yokohama (JP); Kiyotaka Ozaki, Yokosuka (JP); Kenjo Umezaki, Yokosuka (JP)

(73) Assignee: Ichikoh Industries Ltd., Tokyo (JP)

( * ) Notice: Subject to any disclaimer, the term of this patent is extended or adjusted under 35 U.S.C. 154(b) by 0 days.

(21) Appl. No.: 09/727,575

(22) Filed: Dec. 4, 2000

(65) Prior Publication Data

US 2001/0038537 A1 Nov. 8, 2001

(30) Foreign Application Priority Data

Dec. 3, 1999 (JP) .......................................... 11-345012

(51) Int. Cl.[7] .................................................. B60Q 1/08

(52) U.S. Cl. ....................... 362/512; 362/539; 362/282; 362/283; 362/322

(58) Field of Search ................................ 362/539, 282, 362/283, 284, 322, 323, 324, 512, 513

(56) References Cited

U.S. PATENT DOCUMENTS

| | | | | |
|---|---|---|---|---|
| 4,875,141 A | | 10/1989 | Miyauchi et al. | |
| 4,967,319 A | * | 10/1990 | Seko | 362/428 |
| 5,339,226 A | * | 8/1994 | Ishikawa | 362/282 |
| 5,373,424 A | * | 12/1994 | Ishikawa | 362/282 |
| 5,707,129 A | * | 1/1998 | Kobayashi | 362/283 |
| 6,116,764 A | | 9/2000 | Eichhorn et al. | |
| 6,179,455 B1 | * | 1/2001 | Taniuchi | 362/282 |
| 6,234,655 B1 | * | 5/2001 | Sushiro et al. | 362/515 |

FOREIGN PATENT DOCUMENTS

| | | |
|---|---|---|
| EP | 0 900 972 | 3/1999 |
| GB | 2 275 764 | 9/1994 |
| JP | A1 11-066908 | 3/1999 |

* cited by examiner

*Primary Examiner*—Thomas M. Sember
(74) *Attorney, Agent, or Firm*—Foley & Lardner

(57) ABSTRACT

At least one of diagonal cut lines CL1 and CL2, and horizontal cut lines CL3 and CL4 among a spatial distribution pattern PL of luminous intensity for a low beam can be changed.

9 Claims, 7 Drawing Sheets

HEAD LAMP FOR AUTOMOBILE

BACKGROUND OF THE INVENTION

The present invention relates to a head lamp for an automobile which can obtain a spatial distribution pattern of luminous intensity for a low beam (for passing each other) having a diagonal cut line and a horizontal cut line, and more particularly to a head lamp for an automobile which can change at least one of the diagonal cut line and the horizontal cut line, thereby improving a visibility and preventing a forward traveling vehicle, a vehicle traveling in the opposite direction and a pedestrian from being dazzled.

This kind of head lamp for the automobile is generally provided with a light source bulb and a reflector. When turning on the light source bulb, the light beams emitted from the light source bulb are reflected by the reflector and are irradiated to an external portion in accordance with the spatial distribution pattern of luminous intensity for the low beam having the diagonal cut line and the horizontal cut line.

However, since the conventional head lamp for the automobile mentioned above is structured such that at least one of the diagonal cut line and the horizontal cut line is fixed, the visibility is constant.

In this case, as a related art investigated by inventors, Japanese Unexamined Patent Publication No. H11-66908 discloses a head lamp for an automobile in which a shade is made movable so as to switch between a spatial distribution pattern of luminous intensity for a low beam and a spatial distribution pattern of luminous intensity for a high beam (for traveling). However, since the head lamp for the automobile only switches between the spatial distribution pattern of luminous intensity for the low beam and the spatial distribution pattern of luminous intensity for the high beam and at least one of the diagonal cut line and the horizontal cut line of the spatial distribution pattern of luminous intensity for the low beam is fixed, the visibility is constant as in the same manner as the conventional head lamp for the automobile mentioned above.

SUMMARY OF THE INVENTION

An object of the present invention is to provide a head lamp for an automobile which can change at least one of a diagonal cut line and a horizontal cut line, thereby improving a visibility and preventing a forward traveling vehicle, a vehicle traveling in the opposite direction and a pedestrian from being dazzled.

According to a first aspect of the present invention, in order to achieve the object mentioned above, there is provided a head lamp for an automobile, comprising a movable shade for forming a diagonal cut line, in which the movable shade can move between a first position at which a standard diagonal cut line can be obtained and a second position at which a diagonal cut line having a larger angle of incline than that of the standard diagonal cut line.

Further, according to another aspect of the present invention, in order to achieve the object mentioned above, there is provided a head lamp for an automobile comprising a movable shade for forming a horizontal cut line, in which the movable shade can move between a first position at which a standard horizontal cut line can be obtained and a second position at which a diagonal cut line obtained by inclining the standard horizontal cut line.

As a result, since the head lamp for the automobile according to the present invention can change at least one of the diagonal cut line and the horizontal cut line among the spatial distribution pattern of luminous intensity for the low beam, a visibility can be improved and it is possible to prevent a forward traveling vehicle, a vehicle traveling in the opposite direction and a pedestrian from being dazzled.

DESCRIPTION OF THE PREFERRED EMBODIMENTS

In the following description, reference symbol "L" denotes a "left side" in the case of viewing a front portion from a driver side, reference symbol "R" denotes a "right side" in the case of viewing the front portion from the driver side, reference symbol "U" denotes an "upward side" in the case of viewing the front portion from the driver side, and reference symbol "D" denotes a "downward side" in the case of viewing the front portion from the driver side.

Further, reference symbol "Z-Z" denotes an "optical axis", reference symbols "HL-HR" and "HR-HL" denote a "horizontal axis" being horizontal with respect to the optical axis Z-Z or a "horizontal axis" of a spatial distribution pattern of luminous intensity, and reference symbol "VU-VD" denotes a "vertical axis" being vertical with respect to the optical axis Z-Z or a "vertical axis" of the spatial distribution pattern of luminous intensity.

FIGS. 1 to 4 show a first embodiment of a head lamp for an automobile according to the present invention.

Figure 1:
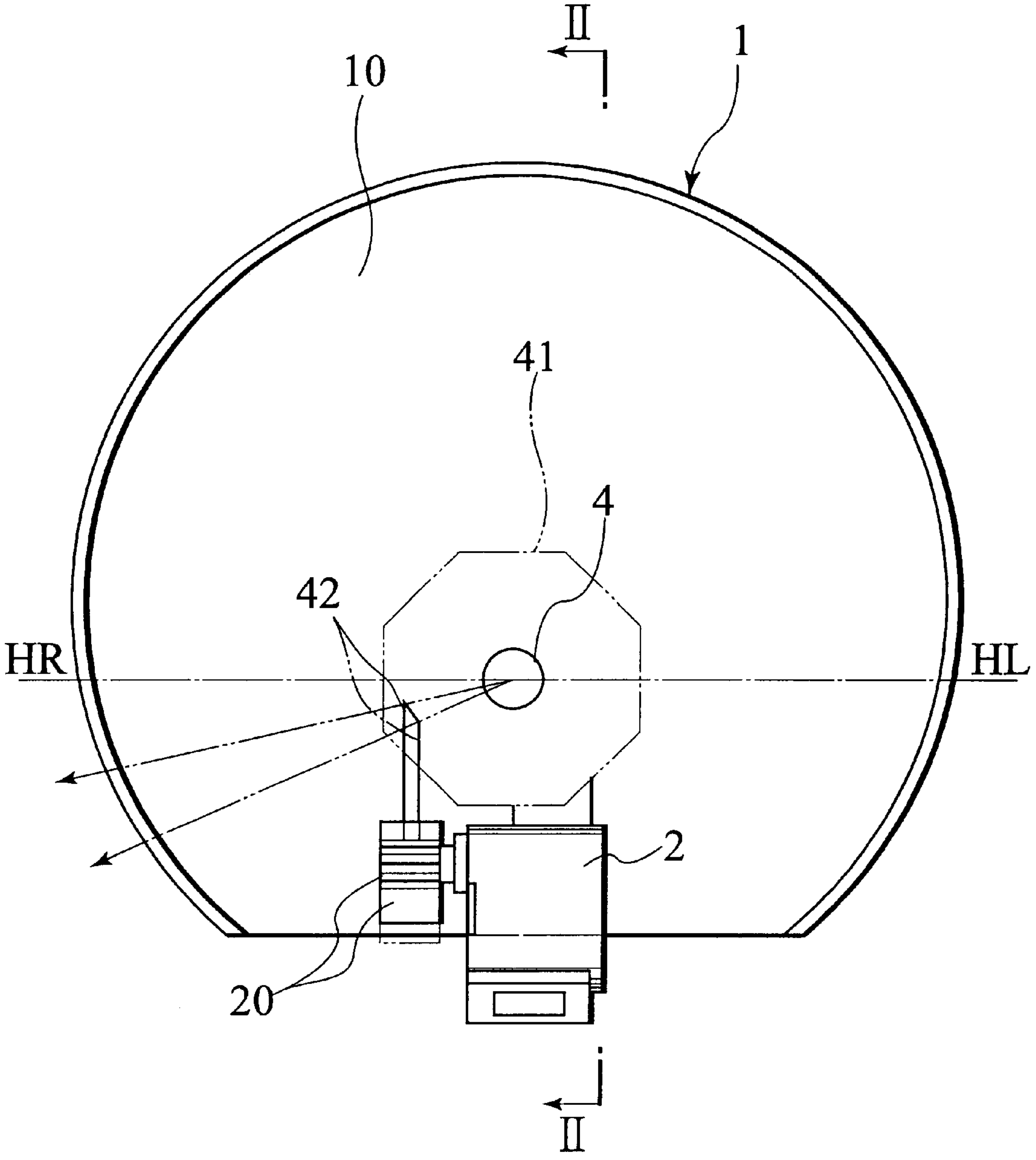
FIG. 1 is a front elevational view of a main portion (a reflector) showing a first embodiment of a head lamp for an automobile according to the present invention.
Figure 2:
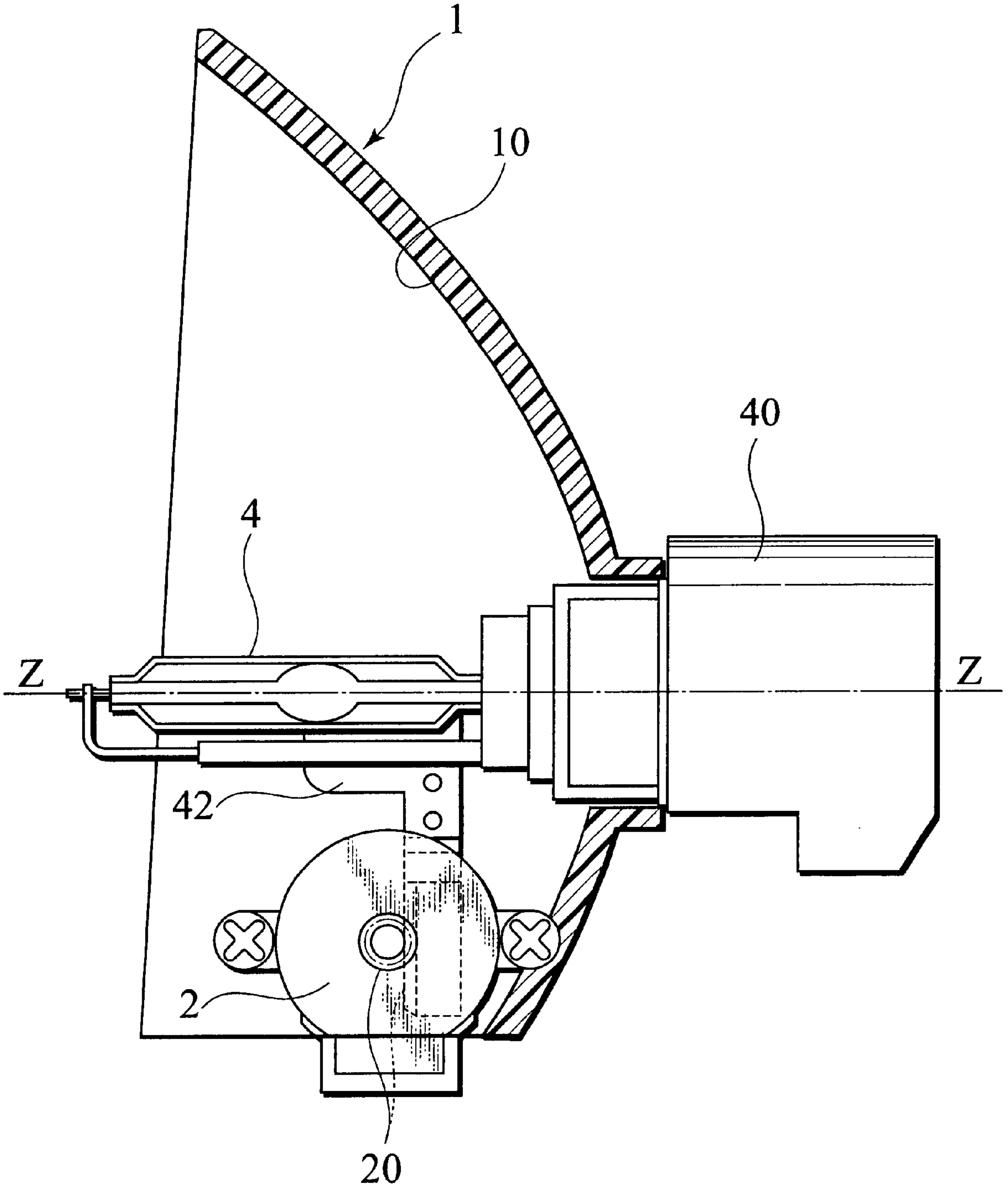
FIG. 2 is a cross sectional view along a line II—II in FIG. 1.
Figure 3:
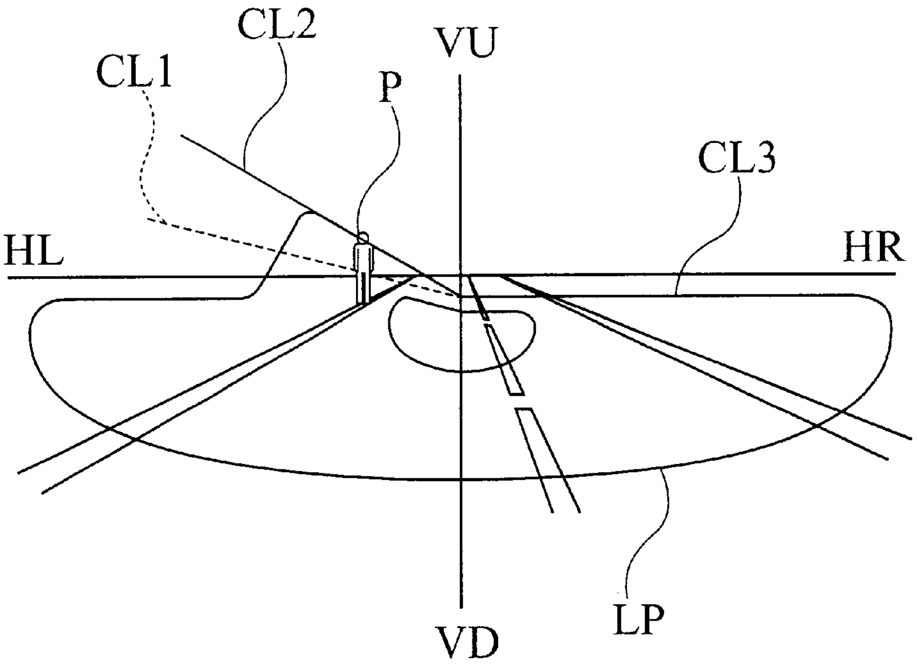
FIG. 3 is a front elevational schematic view of a spatial distribution pattern of luminous intensity for a low beam according to the first embodiment.
Figure 4:
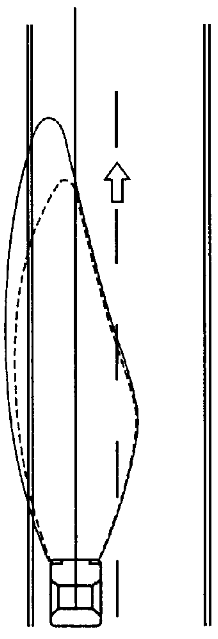
FIG. 4 is a plan schematic view of the spatial distribution pattern of luminous intensity for the low beam according to the first embodiment.

A reflection surface 10 forming a spatial distribution pattern of luminous intensity LP for a low beam shown in FIG. 3 is provided on an inner surface of the reflector 1. The reflection surface 10, for example, forms a rotational oval surface. A discharge lamp (a high pressure metal vapor discharge lamp, a high intensity discharge lamp (HID) or the like) 4 serving as a light source bulb is detachably mounted to the reflector 1 via a socket 40, and a fixed shade 41 is arranged in front of the discharge lamp 4. Further, a movable shade 42 is arranged in the side of the discharge lamp 4.

The movable shade 42 is structured such as to form diagonal cut lines CL1 and CL2 shown in FIG. 3, and is arranged so that the movable shade 42 can linearly move between a first position (a position shown by a solid line in FIG. 1) at which a diagonal cut line CL1 (a diagonal cut line shown by a dotted line in FIG. 3) having an incline of about 15 degrees can be obtained and a second position (a position shown by a double dotted chain line in FIG. 1) at which a diagonal cut line CL2 (a diagonal cut line shown by a solid line in FIG. 3) can be obtained, by means of driving means 2 and 20.

The drive means are constituted by a drive motor 2 and a rotational force transmitting mechanism 20 of a rack and pinion type interposed between the drive motor 2 and the movable shade 42.

The reflector 1, the discharge lamp 4, the fixed shade 41, the movable shade 42, the drive motor 2, the rotational force transmitting mechanism 20 and the like are arranged within a lamp chamber (not shown) defined by a lamp housing and a front lens or a front cover (not shown), whereby the head lamp for the automobile is constructed. The head lamp for the automobile is provided in both right and left sides of a front portion in the automobile. In this case, there is a case that the reflector 1 is attached to the lamp housing via a vertical optical axis adjusting mechanism (not shown) and a lateral optical axis adjusting mechanism (not shown) so that the optical axis thereof can be adjusted in a vertical direction and a lateral direction.

The head lamp for the automobile according to the present invention in the first embodiment is constituted by the elements mentioned above, and a description will be given of a used embodiment thereof.

By turning on the discharge lamp 4 when the movable shade 42 is positioned at the first position, there can be obtained a spatial distribution pattern of luminous intensity LP for the low beam having the standard diagonal cut line CL1 having the incline of about 15 degrees shown by a broken line in FIG. 3 and the horizontal cut line CL2.

In this case, in the case that no forward traveling vehicle exists, the drive motor 2 is driven so as to move the movable shade 42 from the first position to the second position. Then, the diagonal cut line changes to the diagonal cut line CL2 having the angle of incline larger than the angle of incline 15 degrees of the standard diagonal cut line CL1. As a result, as shown by the solid lines in FIGS. 3 and 4, an apart portion in comparison with the spatial distribution pattern of luminous intensity of the standard diagonal cut line CL1 (shown by the broken line) is lighted, so that a visibility can be improved. For example, as shown in FIG. 3, it is possible to quickly recognize a pedestrian P on the left side shoulder edge of the road.

Further, in the case that the forward traveling vehicle exists or the pedestrian exists near, the drive motor 2 is driven so as to move the movable shade 42 from the second position to the first position. Then, the diagonal cut line changes to the standard diagonal cut line CL1 having the angle of incline of about 15 degrees. As a result, it is possible to obtain the spatial distribution pattern of luminous intensity of the standard diagonal cut line CL1 shown by the broken lines in FIGS. 3 and 4, so that no dazzling is applied to the forward traveling vehicle and the pedestrian existing near.

Figure 5:
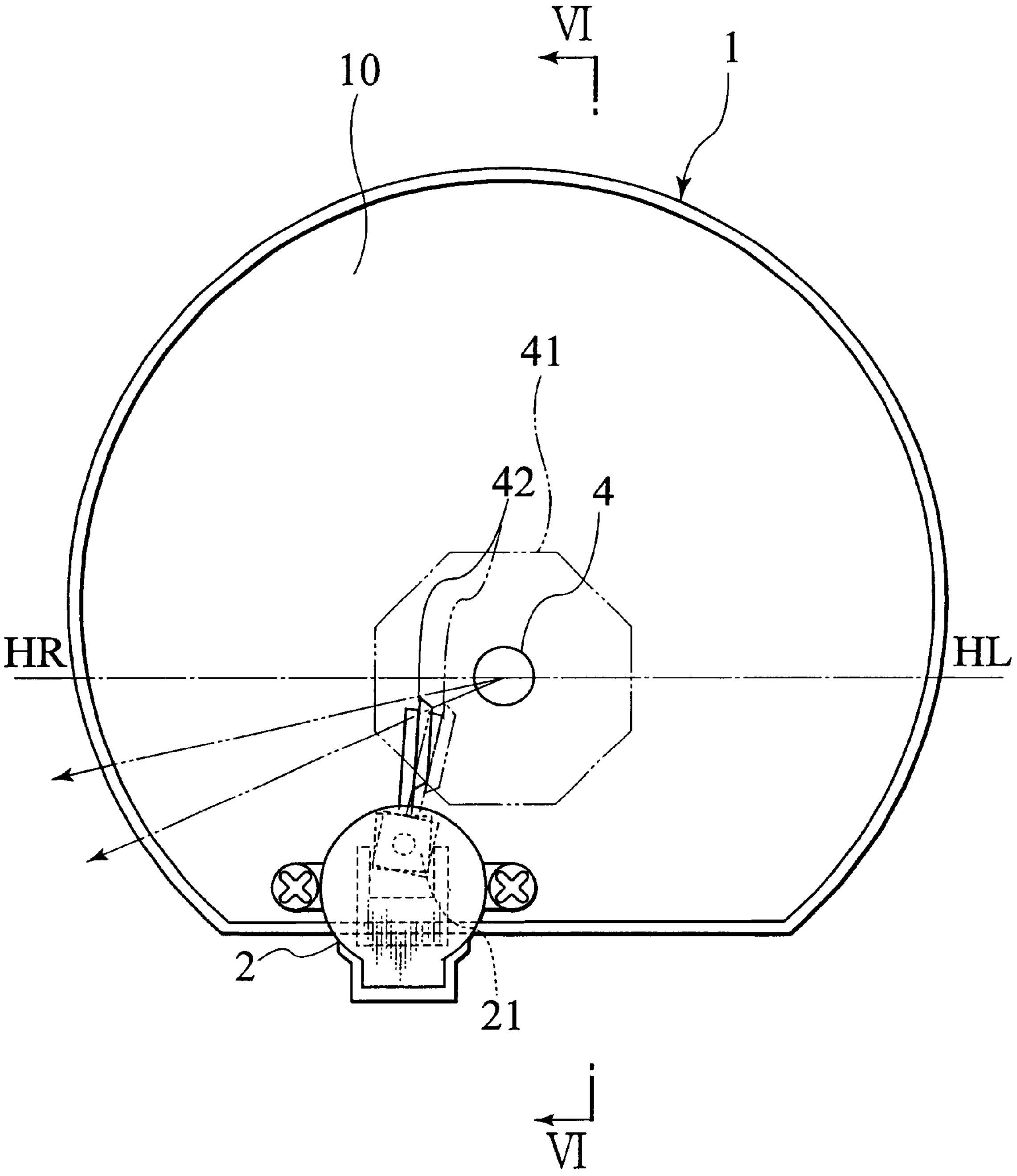
FIG. 5 is a front elevational view of a main portion (a reflector) showing a second embodiment of a head lamp for an automobile according to the present invention.
Figure 6:
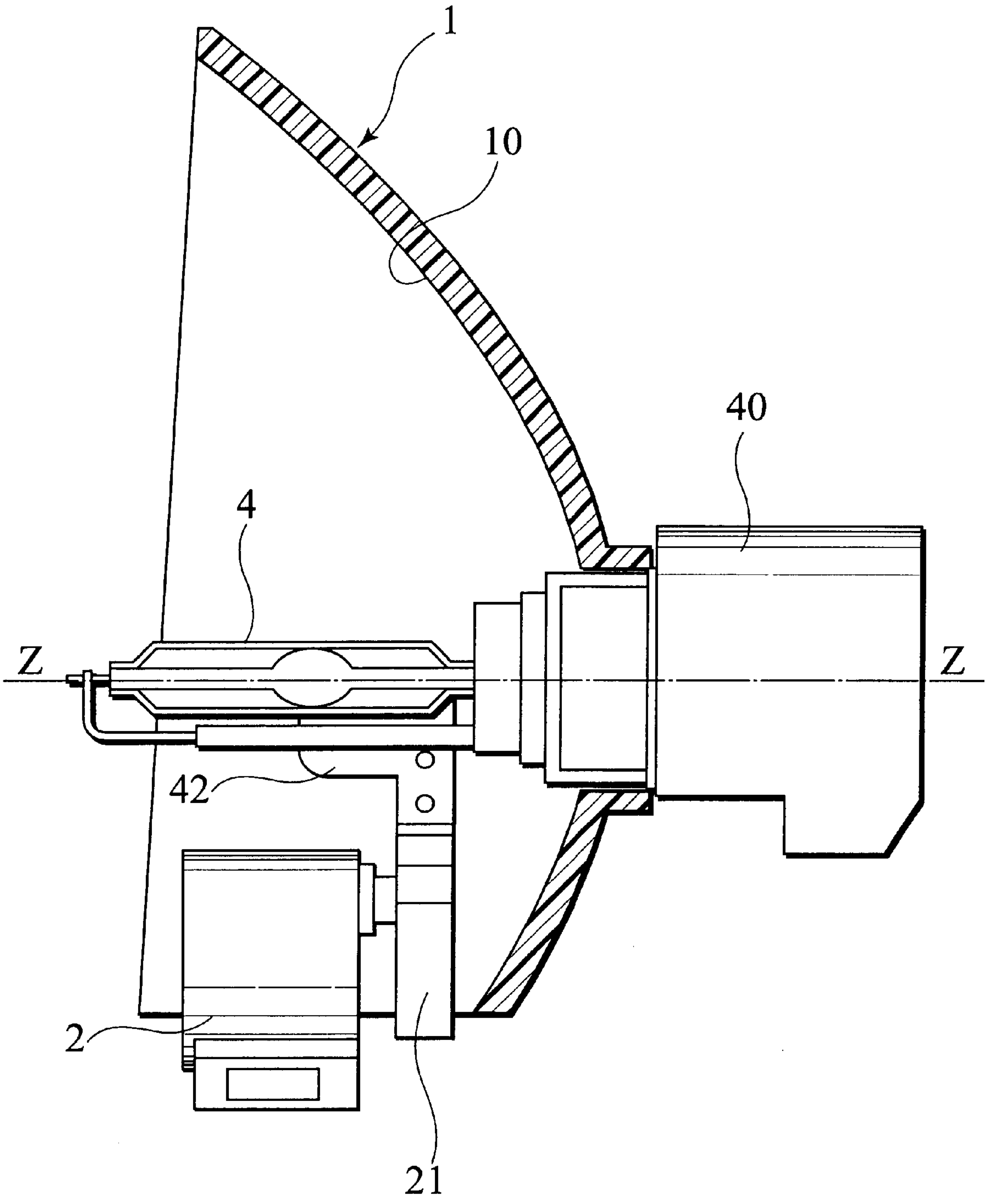
FIG. 6 is a cross sectional view along a line VI—VI in FIG. 5.

FIGS. 5 and 6 show a second embodiment of a head lamp for an automobile according to the present invention. In the drawings, the same reference numerals as those in FIGS. 1 to 4 denote the same elements.

The head lamp according to the second embodiment is structured such that the movable shade 42 is rotated and moved between a first position (a position shown by a solid line in FIG. 5) at which a standard diagonal cut line CL1 having an incline of about 15 degrees can be obtained and a second position (a position shown by a double dotted chain line in FIG. 5) at which a diagonal cut line CL2 having an angle of incline larger than that of the standard diagonal cut line CL1, by means of the drive motor 2 and a rotational force transmitting mechanism 21.

The structure according to the second embodiment can achieve the same operation and effect as those of the first embodiment mentioned above.

In particular, in the structure according to the second embodiment, since the movable shade 42 rotates between the first position and the second position, the movable shade 42 positioned at the second position comes near the discharge lamp 4, so that an accuracy of the diagonal cut line CL2 can be improved. Further, when the movable shade 42 comes near the discharge lamp 4, a density of the light beams is increased at that degree, so that a shading effect can be increased. Further, since the movable shade 42 rotates at a little amount, the driving means 2 and 21 can be made compact so as to be reduced a cost, and a driving accuracy can be improved, so that accurate diagonal cut lines CL1 and CL2 can be obtained.

Figure 7:
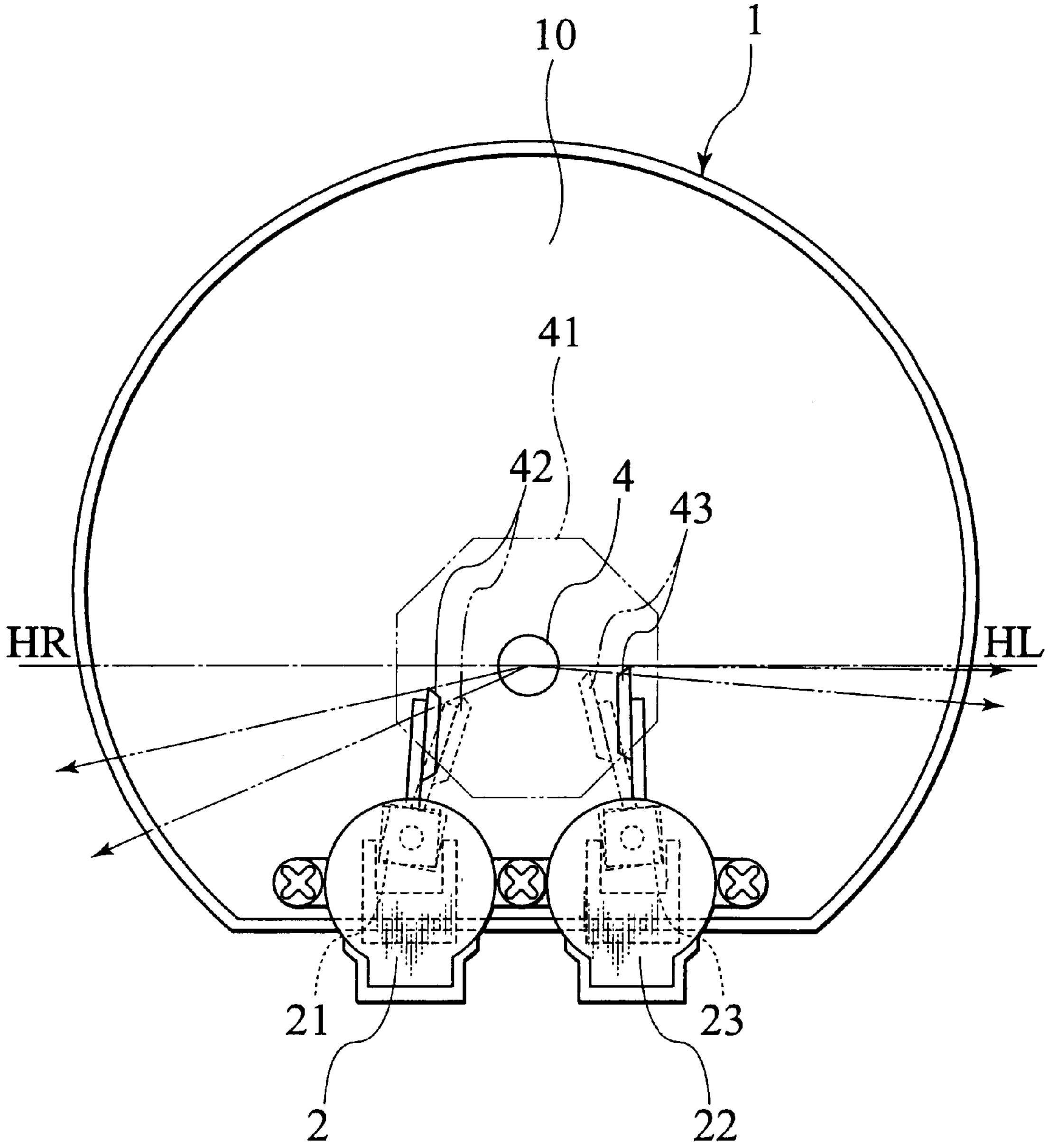
FIG. 7 is a front elevational view of a main portion (a reflector) showing a third embodiment of a head lamp for an automobile according to the present invention.
Figure 8:
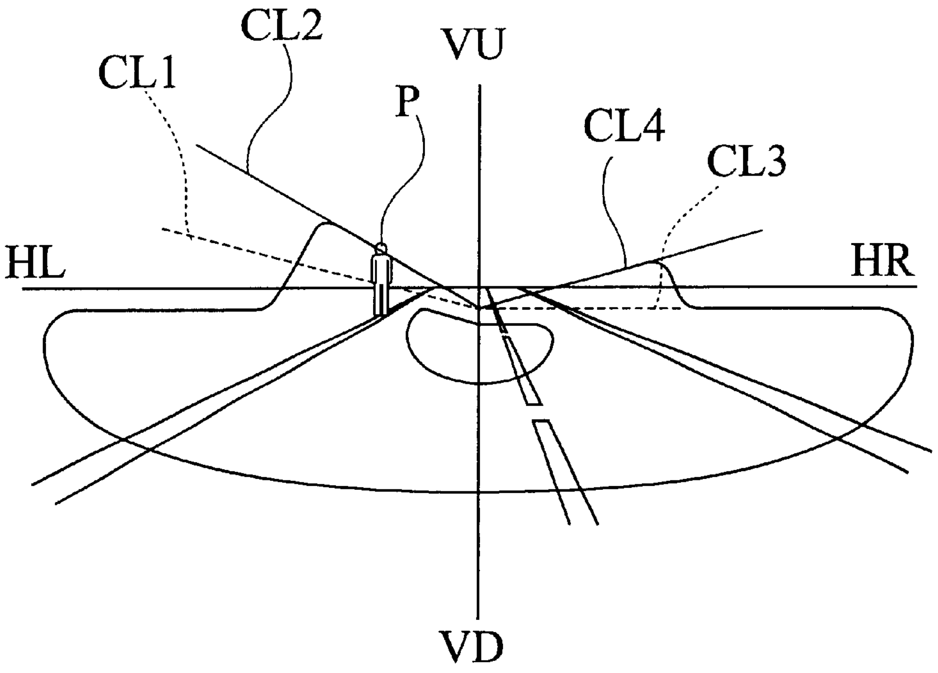
FIG. 8 is a front elevational schematic view of a spatial distribution pattern of luminous intensity for a low beam according to the third embodiment.
Figure 9:
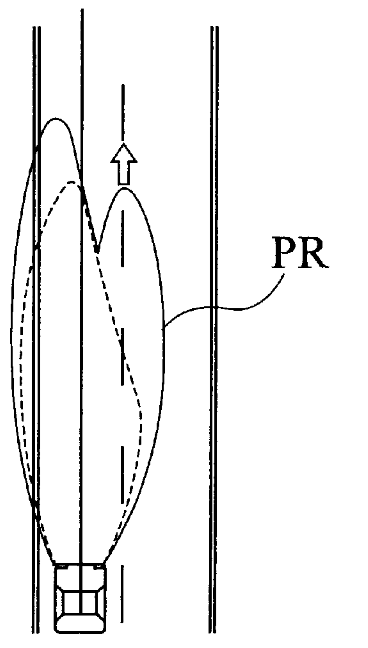
FIG. 9 is a plan schematic view of the spatial distribution pattern of luminous intensity for the low beam according to the third embodiment.

FIGS. 7 to 9 show a third embodiment of a head lamp for an automobile according to the present invention. In the drawings, the same reference numerals as those of FIGS. 1 to 6 denote the same elements.

In the structure according to the third embodiment, the movable shade 42 and the driving means 2 and 21 according to the first and second embodiments mentioned above are replaced by a first movable shade and first driving means, and a second movable shade 43 is arranged in such a manner as to move to a side portion of the discharge lamp 4 by second driving means 22 and 23 together with the first movable shade 42 and the first driving means 2 and 21.

That is, the second movable shade 43 is structured such as to form a horizontal cut line CL3 and a diagonal cut line CL4 shown in FIG. 8, and is arranged so as to be rotatable and movable between a first position (a position shown by a solid line in FIG. 7) at which a second position (a horizontal cut line shown by a dotted line in FIG. 7) at which the standard horizontal cut line CL3 (a cut line shown by a solid line in FIG. 8) can be obtained can be obtained and the diagonal cut line CL4 (a position shown by a double dotted chain line in FIG. 8) inclined with respect to the standard horizontal cut line CL3, by the second driving means 22 and 23 which are the same as the first driving means 2 and 20.

The structure according to the third embodiment can achieve the same operation and effect as those of the first and second embodiments mentioned above.

In particular, since the structure according to the third embodiment is provided with the second movable shade 43, the standard horizontal cut line CL3 shown by the broken line in FIG. 8 can be obtained when the second movable shade 43 is positioned at the first position. Further, in the case that no vehicle traveling in the opposite direction exists, when the second drive motor 22 is driven so as to move the second movable shade 43 from the first position to the second position, a right diagonal cut line CL4 and a right spatial distribution pattern of luminous intensity PR shown by solid lines in FIGS. 8 and 9 can be obtained, so that a visibility can be improved. For example, it is possible to quickly recognize the vehicle traveling in the opposite direction (not shown).

Further, in the case that the vehicle traveling in the opposite direction exists, when the second motor 22 is driven so as to move the second movable shade 43 from the second position to the first position, the cut line is changed from the diagonal cut line CL4 to the horizontal cut line CL3, so that no dazzling is applied to the vehicle traveling in the opposite direction.

In the third embodiment, the structure may be made such that the first movable shade 42 is omitted and only the second movable shade 43 is used.

In this case, in the embodiments mentioned above, the description is given of the head lamp for the automobile traveling on the road for keeping to the left, however, in the case of a head lamp for an automobile traveling on the road for keeping the right, a structure, a spatial distribution pattern of luminous intensity and the like are laterally reversed.

Further, the spatial distribution pattern of the luminous intensity LP for the low beam mentioned above can be controlled only by the reflection surface 10, or the reflection surface and the front lens, or only by the front lens.

Further, as the light source bulb, for example, a light source bulb having a single filament can be employed, in addition to the discharge lamp 4 mentioned above.

What is claimed is:

1. A head lamp for an automobile comprising:

a light source bulb;

a reflector for forming a spatial distribution pattern of luminous intensity for a low beam having a diagonal cut line and a horizontal cut line by reflecting light beams emitted from said light source bulb, said reflector being applied to form said low beam alone;

a movable shade for forming said diagonal cut line, said movable shade being arranged so as to move between a first position at which a standard diagonal cut line can be obtained and a second position at which a diagonal cut line having a larger angle of incline than that of said standard diagonal cut line can be obtained; and driving means for moving said movable shade to said first position and said second position.

2. A head lamp for an automobile according to claim 1, wherein said movable shade linearly moves between said first position and said second position.

3. A head lamp for an automobile according to claim 1, wherein said movable shade rotates between said first position and said second position.

4. A head lamp for an automobile according to claim 1, wherein the movable shade is arranged such that the movable shade shades only light emitted directly from said light source bulb.

5. A head lamp for an automobile comprising:

a light source bulb;

a reflector for forming a spatial distribution pattern of luminous intensity for a low beam having a diagonal cut line and a horizontal cut line by reflecting light beams emitted from said light source bulb, said reflector being applied to form said low beam alone;

a movable shade for forming said cut line, said movable shade being arranged so as to move between a first position at which a standard cut line can be obtained and a second position at which a cut line having a larger angle of incline than that of said standard cut line from a horizontal direction can be obtained; and driving means for moving said movable shade to said first position and said second position.

6. A head lamp for an automobile according to claim 5, wherein said cut line is at least one of a diagonal cut line and a horizontal cut line.

7. A head lamp for an automobile according to claim 5, wherein said movable shade linearly moves between said first position and said second position.

8. A head lamp for an automobile according to claim 5, wherein said movable shade rotates between said first position and said second position.

9. A head lamp for an automobile according to claim 5, wherein the movable shade is arranged such that the movable shade shades only light emitted directly from said light source bulb.

* * * * *